United States Patent [19]

Turman

[11] 3,802,167

[45] Apr. 9, 1974

[54] PARTICLE SAMPLING APPARATUS

[76] Inventor: Bobby N. Turman, 1919 Centralia, Lancaster, Tex. 45324

[22] Filed: June 29, 1973

[21] Appl. No.: 375,241

[52] U.S. Cl.................. 55/396, 55/270, 55/337, 55/457, 73/170 R, 73/421.5 R
[51] Int. Cl............................................. B01d 45/12
[58] Field of Search ............. 55/270, 307, 309, 324, 55/328, 337, 391–393, 396, 422, 456–457; 73/28, 170 R, 421.5, 472, 424, 425.4

[56] References Cited
UNITED STATES PATENTS

| | | | |
|---|---|---|---|
| 2,645,941 | 7/1953 | Reid................................. | 73/170 R |
| 3,059,470 | 10/1962 | Baldwin et al. ......................... | 73/28 |
| 3,252,323 | 5/1966 | Torgeson ......................... | 73/170 R |
| 3,309,518 | 3/1967 | Weiss................................. | 73/28 X |
| 3,355,940 | 12/1967 | Pannetier .......................... | 73/170 R |
| 3,395,516 | 8/1968 | Schecter et al. ................... | 73/170 R |
| 3,576,132 | 4/1971 | Kotoc ................................ | 73/421.5 |
| 3,710,557 | 1/1973 | Couchman........................... | 55/270 |

FOREIGN PATENTS OR APPLICATIONS

192,385  10/1957  Austria................................ 55/396

*Primary Examiner*—Frank W. Lutter
*Assistant Examiner*—Vincent Gifford

[57] ABSTRACT

An apparatus, for collecting particles from a gaseous medium, adapted for use in sampling particulate in the atmosphere, such as from various portions of an atmospheric flight corridor through which is flown an aircraft on which, and external of which, the adapted apparatus is mounted. The inventive apparatus includes: an open-ended flow tube having an inlet and an outlet, to permit the inflow of the particle-entrained gaseous medium and the outflow of the cleared (i.e., cleaned) gaseous medium; deflecting vanes positioned at the tube inlet, to produce swirling flow of the particle-entrained gaseous medium (i.e., the atmosphere); a plurality of collection compartments, disposed essentially intermediate of the inlet and outlet, within which the particles are collected, deposited, and stored, and with each compartment having an entrance to permit the flow therein of that portion of the gaseous medium flow which is particle-entrained, and with each compartment also having an exit across which is removably fitted a filter to allow the resultant cleared (i.e., cleaned) gaseous medium to exhaust; a conically-shaped deflector (i.e., a "skimmer"), positioned within the flow tube and forward of the collection compartments, to divert the flow of the particle-entrained gaseous medium toward and into the collection compartments; a rotatable selection disk, essentially interposed between the skimmer and the collection compartments, having a selectively positional off-center aperture to feed the particle-entrained gaseous medium to the collection compartments; a remotely actuable motor to rotate the selection disk so as to position the off-center aperture in alignment with the entrance of the selected collection compartment; and, a drag-reducing aerodynamically configurated housing, preferably including a removable fore shroud and a removable aft shroud, to contain the other components of the apparatus. Unlike prior art apparatuses, this inventive apparatus permits successful collection of particles, and therefore the sampling, of different particle-entrained gaseous medium flows at different times, places, and the like, without requiring that the entire flow into the apparatus pass through and out of the filters.

3 Claims, 4 Drawing Figures

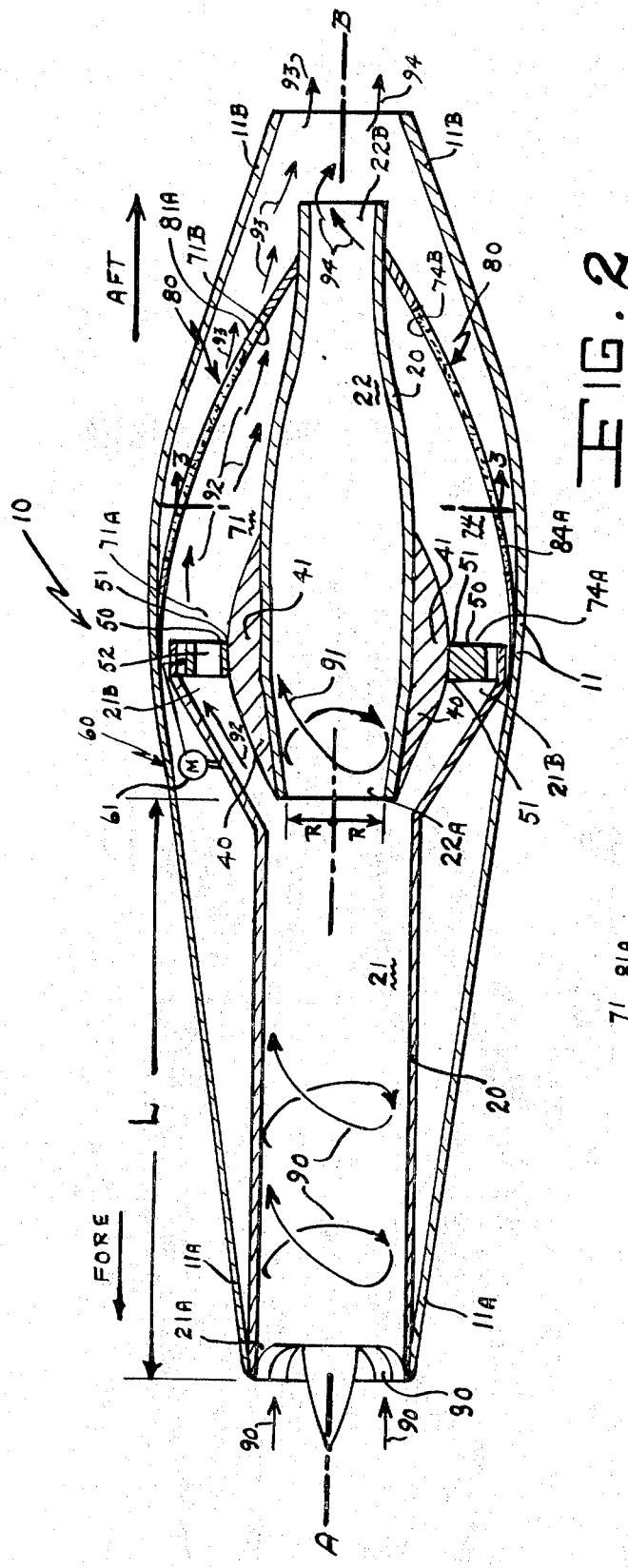
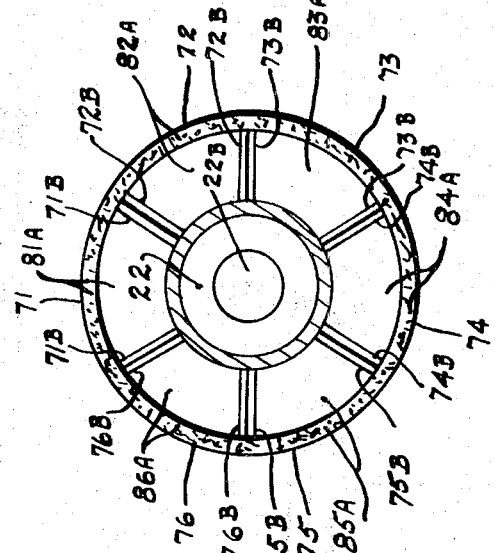

PARTICLE SAMPLING APPARATUS

BACKGROUND OF THE INVENTION

This invention relates to an apparatus for collecting particles from a gaseous medium and, more particularly, to an apparatus which is capable of being used to take various and diverse particle samples from the same, or from different, particle-entrained gaseous medium flows.

As a preliminary matter, it is to be noted and to be remembered that the preferred embodiment of my inventive apparatus which will be discussed later herein is a particular adaptation thereof especially well-suited for use in sampling particulate in the atmosphere, while the apparatus is suitably mounted on, and external of, an aircraft, and is used while the aircraft is in flight. This adaptation is solely by way of preference and of illustration, and not by way of any limitation.

Particulate gaseous samplers are not new, as such. However, as far as is known by the applicant, prior art particulate gaseous samplers (i.e., those into which flows a particle-entrained gaseous medium) have at least one inherent severe disadvantage which is common to all, to wit: the entire particle-entrained gaseous medium flow into the apparatus must pass through the filtering means, such as a filter. This significantly impairs the use of such apparatuses, simply because the maxium flow rate that can be obtained through the filtering means is thereby materially limited. Another distinct disadvantage of prior art particulate gaseous samplers is the fact that the exposed filter must, of necessity, be timely removed and changed with an unexposed filter to prevent malfunction or breakdown of the apparatus. Such timely removal and change is inconvenient and time-consuming, at best. It becomes impossible when the sampling apparatus is mounted external of an aircraft, and the aircraft is in flight, and the filtering means is out of reach of persons aboard the aircraft (e.g., the pilot or other crew members) or the filtering means cannot be changed because of aerodynamic and/or in-flight reasons. It is accurate and fair to say that under such conditions the sampler is grossly inadequate and, for all practical purposes, is ineffective. To date the only solution to such a serious, recurring problem is to land the aircraft, remove the exposed filter, and change to, and replace with, an unexposed filter. This procedure is obviously undesirable: and, in fact, may not be attainable under certain circumstances (e.g., lack of adequate landing facilities). Therefore, a clearly apparent and genuine need exists for a effective airborne air particulate sampling apparatus.

My inventive apparatus obviates the above-mentioned disadvantages of the prior art; fulfills the existing need; and, therefore, significantly advances the state-of-the-art.

SUMMARY OF THE INVENTION

This invention relates to a particle sampling apparatus adapted for use as an airborne air particulate sampling apparatus.

The principal object of this invention is to teach a new, useful, and unobvious apparatus for collecting particles from a gaseous medium, wherein said inventive apparatus is adaptable to, and adapted for, use as an effective airborne air particulate sampling apparatus.

This principal object, and other related and equally important objects (e.g., to permit the successful collection of particles, and therefore the sampling, of different particle-entrained gaseous medium flows at different times, places, and the like, without requiring that the entire flow into the apparatus pass through the filtering means), will become readily apparent after a consideration of the description of the invention, coupled with reference to the drawings.

DESCRIPTION OF THE DRAWING

FIG. 2 is a side elevation view, partially in cross section and partially in simplified schematic form, of the preferred embodiment of my invention shown in FIG. 1, and which also shows the directional flow of the gaseous medium into, through, and out of the preferred embodiment;

FIG. 3 is a cross sectional view of a portion of my invention, as taken along and viewed from line 3—3 shown in FIG. 2.

DESCRIPTION OF THE PREFERRED EMBODIMENT

Figure 1:
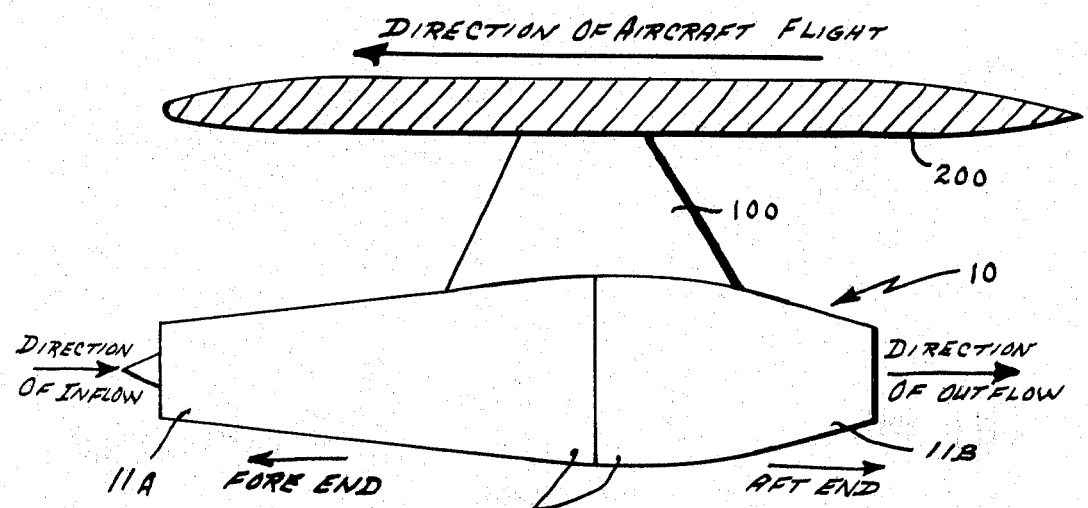
FIG. 1 is a side elevation view of a preferred embodiment of my invention, showing how the embodiment can be mounted on a pylon of an aircraft, and also showing the exterior configuration of the embodiment, with arrows designating the forward (i.e., fore or front) direction or end, and the rearward (i.e., aft or back) direction or end, of the preferred embodiment.

With reference to FIG. 1 wherein the exterior configuration of a preferred embodiment 10 of my inventive apparatus is shown, the preferred embodiment 10 is, by suitable means, attached to or mounted on a pylon 100 of wing 200 (shown in cross section) of an aircraft (not shown). The housing 11 of the embodiment 10 is, as can be seen, of aerodynamic exterior configuration, and preferably includes a removable fore shroud 11A and a removable aft shroud 11B. Also shown in FIG. 1, as designated by directional arrows, are: the forward (i.e., front or fore) end of the preferred embodiment 10; the rearward (i.e., back or aft) end of the preferred embodiment 10; the direction of flight of the aircraft; and, the direction of inflow of the particle-entrained gaseous medium (which, in this case, is the atmosphere) and the direction of outflow of the particle-cleared (i.e., cleaned) gaseous medium.

With reference to FIG. 2, therein is shown a side elevation view, partially in cross section, of the preferred embodiment 10 shown in FIG. 1. The embodiment 10 includes: a centrally located, hollow flow tube, generally designated by reference numeral 20, which has a longitudinal axis A—B, and which preferably comprises two sections 21 and 22 that are open-ended and which four open ends are in alignment. The first section 21 is the front or fore section; and, is open-ended, with a forwardly disposed inlet 21A which serves as the forwardly disposed open end of flow tube 20, and with a rearwardly disposed open end 21B which is of a greater cross section than inlet 21A. The second section 22 is positioned rearwardly of, and in alignment with, the first section 21; has a forwardly disposed open end 22A, which is of smaller cross section than open end 21B of section 21, and which is in communication with and partially within open end 21B of section 21; and, has a rearwardly disposed outlet 22B which serves as the rearwardly disposed open end of flow tube 20, and which is of smaller cross section than inlet 21A.

Still with reference to FIG. 2, the preferred embodiment 10 also includes: a plurality of deflecting vanes 30 positioned at the forwardly disposed inlet 21A of the first section 21 of the flow tube 20; a hollow deflector 40 (hereinafter referred to as the "skimmer"), essentially in the form of a frustum of a cone having a base portion 41, which is positioned with the base portion 41 facing rearwardly (i.e., aft) and surrounding and abutting the forwardly disposed open end 22A of the second section 22 of the flow tube 20; a rotatable selection disk 50 having therein a centrally located opening 51, and also having an off-center aperture 52, and the selection disk surrounds, abuts with, and is rotatable around the hollow deflector 40 and, simultaneously, abuts with the rearwardly disposed open end 21B of the first section 21 of the flow tube 20; means, generally designated 60, for rotating the rotatable selection disk 50 around skimmer 40, with the means 60 including a motor 61 which is actuated, energized, and otherwise controlled remotely by suitable conventional means (not shown) which preferably are located in the aircraft and are readily available to, useable by, and controllable by a crew member, such as the pilot of the aircraft; a plurality, preferably six, of particle collection compartments, such as 71 and 74, which are positioned rearward of, and abutting with, the selection disk 50, with each of the compartments having an entrance, such as 71A for collection compartment 71 and 74A for collection compartment 74, and an exit, such as 71B for compartment 71 and 74B for compartment 74, and with each entrance, such as 71A and 74A, being of the same or similar configuration as off-center aperture 52 of selection disk 50 and with each entrance so located that each entrance may be individually and separately selected, by rotation of the selection disk 50, so as to be in registration (in alignment) with the off-center aperture 52; means, generally designated 80, for filtering the particles in the particle-entrained gaseous medium, with the means 80 including a plurality of filters, such as 81A and 84A, (i.e., one for each compartment), and with each filter removably fitable and fitted across the exit of its individual collection compartment (e.g., filter 81A removably fitted across exit 71B of collection compartment 71); and, an open-ended removable housing 11, preferably aerodynamically designed to reduce drag, to contain the flow tube 20, the deflecting vanes 30, the hollow skimmer 40, the rotatable selection disk 50, the means 60 for rotating the selection disk 50, the particle collection compartments (such as 71 and 74), and the particle filtering means 80, and with the housing 11 preferably including a removable fore shroud 11A and a removable aft shroud 11B.

With reference to FIG. 3, therein is shown in cross section a portion of the preferred embodiment 10, as viewed from, and along, line 3—3 in FIG. 2. Shown are: second section 22 of flow tube 20 and outlet 22B; particle collection compartments 71-76, inclusive; collection compartments exits 71B-76B, inclusive; and, filters 81A-86A, inclusive.

Figure 4:
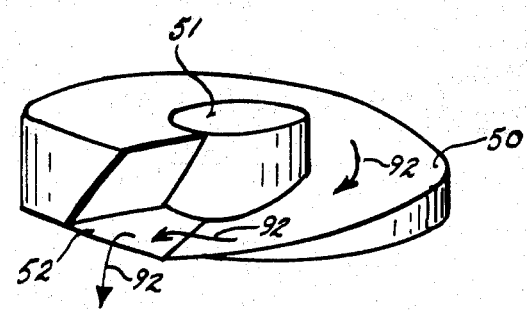
FIG. 4 is a perspective view of a major component of my invention.

With reference to FIG. 4, therein is shown in perspective the rotatable selection disk 50 with centrally located opening 51 and off-center aperture 52. It is to be noted that, as a matter of preference, selection disk 50 is of a spiral shape (i.e., the disk 50 winds around its central opening 51 and gradually recedes from central opening 51 and approaches off-center aperture 52. Also shown in FIG. 4, by directional arrows designated 92, is the diverted flow of the particle-entrained gaseous medium.

MODE OF OPERATION OF THE PREFERRED EMBODIMENT

The mode of operation of the preferred embodiment 10 of my inventive apparatus is self-evident and is easily understandable by a person of ordinary skill in the art from the foregoing description of the preferred embodiment 10, coupled with reference to the drawings, particularly FIG. 2.

However, for those not in the art, the following succint explanation will clearly describe the mode of operation.

The particle-entrained gaseous medium, generally designated by directional arrows 90 in FIG. 2, enters the flow tube 20 of embodiment 10 through deflecting vanes 30 and inlet 21A. The deflecting vanes 30 impart a swirl to the particle-entrained gaseous, medium, with the result that the medium 90 flows swirlingly within first section 21 of flow tube 20 in an aft (i.e., rearward) direction. Centrifugal force acting on the particles in the swirling flow 90 causes the particles to migrate away from the center of the flow. After travelling an axial length, such as is designated by "L" in FIG. 2, all particles will be within the skimming radius, such as is designated "R" in FIG. 2, and will be diverted by the skimmer 40 toward the selection disk 50 and the collection compartments 71-76. Meanwhile, particle-freed (i.e., cleared or cleaned) flow of the gaseous medium, generally designated 91 in FIG. 2, enters into and through the second section 22 of the flow tube 20. At the same time, that portion of the gaseous medium which is still particle-entrained, generally designated 92 in FIG. 2, flows through the off-center aperture 52 of selection disk 50 and into the selected or preselected individual particle collection chamber, such as 71 in FIG. 2, within which 71 the particles are collected, deposited, and stored, since the particles are prevented from leaving the chamber 71 because of the filter of the filtering means, such as 81A of 80, which is removably fitted across the exit 71B of chamber 71. It is here to be noted that the flow rate of the gaseous medium which is still particle-entrained, such as 92, will be only a small portion of the initial flow rate, such as 90, and that the filter provided, such as 81A, will have sufficient area to handle the reduced flow rate, such as 92 and 93. It is here also to be noted that the tapered aft section of the embodiment 10, which includes outlet 22B and the exhaust exit formed by removable aft shroud 11B, utilizes the clean air jet, such as is generally designated as 94 in FIG. 2, as an ejector pump, thereby reducing the pressure behind the filter 81A and thus increasing the mass flow rate capacity of the filter means and/or system 80. With reference again to the particle-entrained flow 92, the particle-freed or cleared gaseous flow 93 which leaves the chamber 71 then moves rearwardly (i.e., aft) and joins and melds with the already-cleared gaseous medium flow 94, and both of the cleared flows 93 and 94 leave embodiment 10. The sample (i.e., the particles collected in any chamber) easily can be removed by removing aft shroud 11B. Likewise, the filter, such as 81A also can be removed and replaced.

With regard to axial length L and skimming radius R, FIG. 2, experiments establish that for an axial length L of 1 meter, the skimming radius R should be 10 centimeters, the total length of flow tube 20 should be 2 meters, and the maximum diameter of flow tube 20, such as at open end 21B of flow tube section 21, should be 60 centimeters.

CONCLUSION

It is clear from all of the foregoing, and from the drawings herein, that the desired objects of my invention have been attained.

It is emphasized that, although there have been shown the fundamental and unique features of my inventive apparatus as applied to a preferred embodiment which has been adapted for a particular use, it is to be understood that various substitutions, omissions, additions, and other adaptations can be made to my inventive apparatus by those of ordinary skill in the art, without departing from the spirit of my invention. For example, the selection disk 50 may be modified to have a plurality of off-center apertures, rather than the single aperture 52 shown and described, so that a plurality of samples of the same particle-entrained gaseous medium may be made simultaneously.

What I claim is:

1. An apparatus for collecting particles from a gaseous medium, comprising:
   a. a centrally located, hollow, open-ended flow tube having a longitudinal axis, and also having a forwardly disposed open end and a rearwardly disposed open end which said open ends are in alignment, and wherein said flow tube includes:
      1. a first section having a forwardly disposed inlet which serves as the forwardly disposed open end of said flow tube, and with said first section also having a rearwardly disposed open end of greater cross section than said inlet;
      2. a second section positioned rearward of said first section and in alignment with said first section, and with said second section having a forwardly disposed open end of smaller cross section than said rearwardly disposed open end of said first section, with said forwardly disposed open end of said second section in communication with and partially within said rearwardly disposed open end of said first section, and with said second section also having a rearwardly disposed outlet which serves as the rearwardly disposed open end of said flow tube and which is of smaller cross section than said inlet;
   b. a plurality of deflecting vanes positioned at said forwardly disposed inlet of said first section of said flow tube;
   c. a hollow deflector, essentially in the form of a frustum of a cone having a base portion, positioned with the base portion thereof facing rearwardly and surrounding and abutting the forwardly disposed open end of said second section of said flow tube;
   d. a spiral rotatable selection disk having therein a centrally located opening, and also having at the downstream end of said spiral an off-center aperture therein, with said selection disk surrounding, abutting with, and rotatable around said hollow deflector, and with said selection disk simultaneously abutting with said rearwardly disposed open end of said first section of said flow tube;
   e. means for rotating said rotatable selection disk, wherein said rotating means includes a motor;
   f. a plurality of particle collection compartments positioned rearward of, and abutting with, said selection disk, with each said compartment having an entrance and an exit, and with each said entrance being of the same configuration as said off-center aperture of said rotatable selection disk, and also with each said entrance so located that each said entrance may be individually and separately selected by rotation of said selection disk, so as to be in registration with said off-center aperture of said selection disk;
   g. means for filtering the particles in the particle-entrained gaseous medium, wherein said filtering means includes a plurality of particle filters, one said filter for each said collection compartment, and wherein each said filter is removably fitted across said exit of its individual collection compartment;
   h. an open-ended removable housing to contain said flow tube, said deflecting vanes, said hollow deflector, said rotatable selection disk, said means for rotating said disk, said particle collection compartments, and said particle filtering means.

2. The apparatus, as set forth in claim 1, wherein said open-ended removable housing includes a removable fore shroud and a removable aft shroud.

3. The apparatus, as set forth in claim 1, wherein said open-ended removable housing is of aerodynamic configuration to reduce drag.

\* \* \* \* \*

UNITED STATES PATENT OFFICE
CERTIFICATE OF CORRECTION

Patent No. 3,802,167   Dated April 9, 1974

Inventor(s) Bobby N. Turman

It is certified that error appears in the above-identified patent and that said Letters Patent are hereby corrected as shown below:

On the front page add:

--/73/ Assignee: The United States of America as represented by the Secretary of The Air Force, --

Signed and sealed this 1st day of October 1974.

(SEAL)
Attest:

McCOY M. GIBSON JR.
Attesting Officer

C. MARSHALL DANN
Commissioner of Patents